United States Patent Office 3,567,259
Patented Mar. 2, 1971

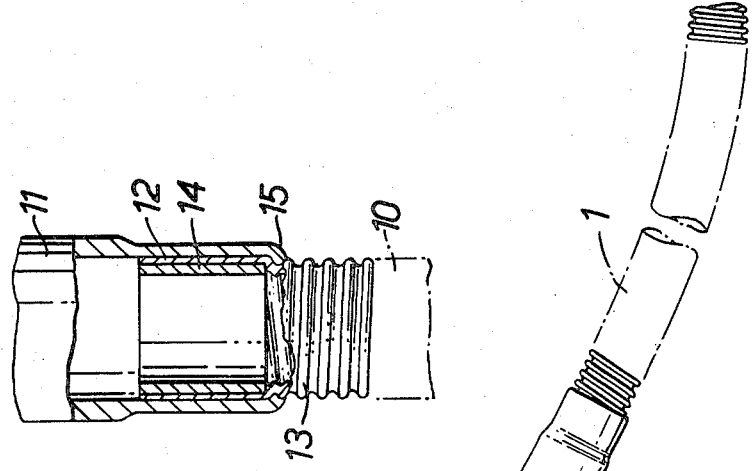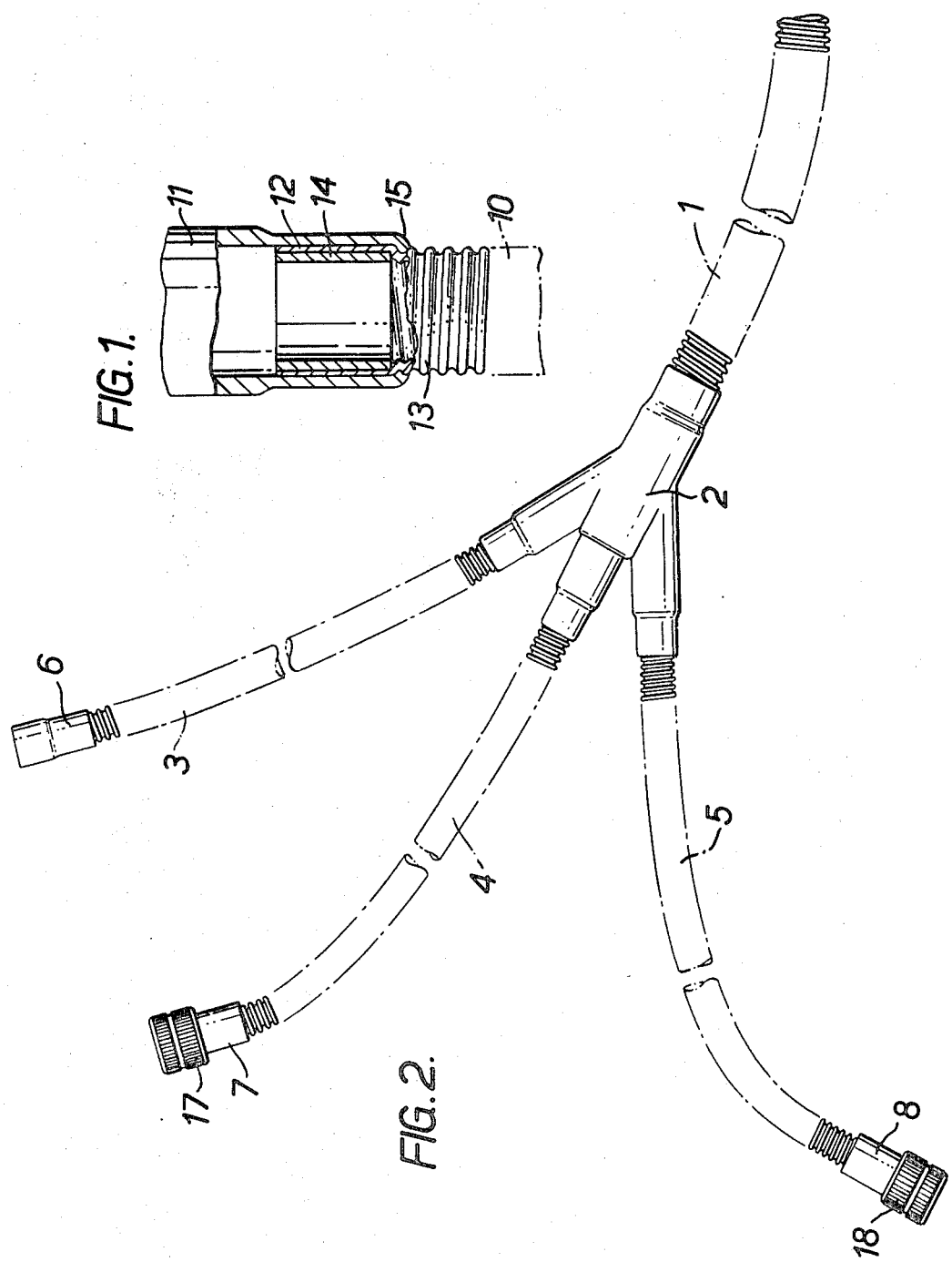

3,567,259
SHRUNK FIT TUBE COUPLING
Brian Benson, Winnersh, near Wokingham, and Ian Martin Cleare, High Wycombe, England, assignors to Smiths Industries Limited, London, England
Filed Oct. 3, 1968, Ser. No. 764,776
Int. Cl. F16l 13/10, 47/02
U.S. Cl. 285—381                                6 Claims

ABSTRACT OF THE DISCLOSURE

A union between a fitting and a convoluted plastics hose comprising an irradiated shrink-down material for the fitting and a hollow rigid cylindrical ferrule of nylon or aluminium alloy within a smooth non-convoluted end of the hose whereby the ferrule restrains deformation of the hose end when the fitting is shrunken over it. The convolutions are removed from the hose end and the end is formed with an external diameter equal to the external diameter of the convolutions by stretching the end of the hose over a heated mandrel and applying a tool to the hose end exterior surface. The fitting in its pre-formed expanded state and the hose may be so positioned with respect to one another that after shrinking an end edge of the fitting lies in the space between two neighbouring convolutions. An epoxy resin adhesive layer may be provided between the ferrule and the smooth interior surface of the hose end, or between the fitting and the smooth exterior surface of the hose end, or both.

This invention relates to unions and methods of forming unions and in particular to the union of a fitting to a tubular member.

According to one aspect of this invention there is provided a union of a fitting to a tubular member, in which at least part of the fitting is of irradiated shrink-down material shrunken over an end of the tubular member and in which at least the end of the tubular member is of a pressure-deformable material, wherein a substantially rigid hollow cylindrical ferrule is disposed within the end of the tubular member.

The tubular member may be formed from a polymerised fluorocarbon, preferably polytetrafluoroethylene (hereinafter referred to as P.T.F.E.). The tubular member may be corrugated or convoluted.

The irradiated shrink-down material may be of polymerized fluorocarbon such as P.T.F.E., or a polyolefine, or a synthetic rubber such as that sold in the United Kingdom under the trademark "Viton B."

The hollow cylindrical ferrule may be of a suitable plastics material, preferably nylon; or of a light-weight aluminium alloy, preferably that sold in the United Kingdom under the trademark "Dural."

The ferrule may be adhesively retained within the end of the tubular member by an epoxy resin adhesive. An epoxy resin adhesive may be provided between the fitting and the tubular member. Preferably, the epoxy resin adhesive is that sold in the United Kingdom under the trademark "Araldite."

In the case where the tubular member is corrugated or convoluted, there may be an absence of corrugations or convolutions adjacent the end so as to provide a smooth exterior end. This smooth end may be of external diameter substantially equal to the external diameter of the corrugations or convolutions. The ferrule may abut the last corrugation or convolution inside the tubular member. The ferrule may extend to the edge of the tubular member within the smooth exterior end.

Preferably an end edge of the fitting lies in the space between two neighbouring corrugations or convolutions.

According to another aspect of this invention there is provided a method of forming a union, comprising the insertion of a substantially rigid hollow cylindrical ferrule within an end of a pressure deformable tubular member, and the shrinking over this end of a fitting of irradiated shrink-down material.

Prior to insertion, the ferrule may be coated with an epoxy resin adhesive. The end of the tubular member may be coated with an epoxy resin adhesive prior to the fitting being shrunken over the end.

Preferably the epoxy resin adhesive is that sold in the United Kingdom under the trademark "Araldite."

In the case where the tubular member is corrugated or convoluted, the corrugations or convolutions adjacent the end may be removed prior to insertion of the ferrule to form a smooth exterior end. This smooth end may be formed to have an external diameter substantially equal to the external diameter of the remaining corrugations or convolutions, and the ferrule may be then inserted to abut the last corrugation or convolution remaining inside the tubular member.

The removal of the corrugations or convolutions and the forming of the end may be simultaneously performed by stretching the end of the tubular member over a heated mandrel and applying a tool to the external surface of the end.

The shrinking of the fitting over the end of the tubular member may be performed by positioning the end containing the ferrule within the pre-formed expanded fitting and applying heat to the fitting by means of a hot-air gun until the fitting shrinks and grips the end of the tubular member.

Preferably the pre-formed expanded fitting and the tubular member are so positioned with respect to one another that after shrinking an end edge of the fitting lies in the space between two neighbouring corrugations or convolutions.

By way of example, one embodiment of the invention will now be described, reference being made to the accompanying drawing of which:

FIG. 1 is a partly-sectioned longitudinal view of a union according to the invention, and FIG. 2 shows part of a harness for electrical cables.

In a harness for electrical cables, a main length of flexible tubing is united to one or more subsidiary lengths of flexible tubing by a fitting (hereinafter referred to as a junction) and each subsidiary length of flexible tubing may terminate in a fitting for securing the subsidiary length to a fixture (such a fitting being hereinafter referred to as a termination) or in another junction. A fracture of any length of tubing in the harness may be repaired by uniting the parts to each side of the fracture to a fitting such as a short length of tubing.

In FIG. 2 a main length of flexible tubing is indicated at 1; a junction is indicated at 2; subsidiary lengths of flexible tubing are indicated at 3, 4, 5; and terminations are indicated at 6, 7, 8.

As shown in FIG. 1, a length of flexible convoluted tubing 10 is united to a fitting 11 of irradiated shrink-down material. This union is formed in a manner to be described. One end of the tubing 10 is stretched over a heated mandrel (not shown) and a tool is applied over the exterior surface of the end to remove the end convolutions and leave a smooth end exterior 12 of external diameter substantially equal to the exterior diameter of the remaining convolutions 13. After removing the length of tubing from the mandrel, a substantially rigid hollow cylindrical ferrule 14 of nylon is coated with an epoxy resin adhesive (such as that sold in the United Kingdom under the trademark "Araldite") and is inserted within the end 12 of the tubing 10 until it abuts the last convolution remaining inside the tubing. The axial length of the ferrule is equal to the axial length of smooth end 12. A similar epoxy resin adhesive is applied to the external surface of smooth end 12.

A pre-fabricated expanded fitting of irradiated shrink-down material (in this embodiment a polyolefine) is positioned to have a part of it encompassing the end 12 of the tubing 10. Hot air from a gun is directed onto the fitting which attempts to shrink to a third or a quarter of its original size and thus securely grips the end 12 of the tubing 10. It should be noted that the fitting is so positioned that after shrinking an end edge 15 of the fitting lies in the space between two convolutions 13. The union so formed is completely impervious to fluids and dirt.

In alternative arrangements either or both of the following steps may be omitted:

(i) Coating the ferrule 14 with adhesive.
(ii) Coating the smooth end 12 of the tubing with adhesive.

To produce the harness part shown in FIG. 2, the three subsidiary lengths of tubing 3, 4 and 5 and the main length of tubing 1 are each formed with a smooth end by the method described above. An adhesive coated nylon ferrule of appropriate dimensions is inserted within each end and the ends coated with adhesive and positioned within the pre-fabricated expanded polyolefine junction 2. The junction is heated by a hot air gun until it shrinks and grips the length of tubing 1, 3, 4 and 5. The other end of tubing length 3 is united to the termination 6 in similar fashion to that described above, the ferrule in this union being also of nylon. The other ends of tubing lengths 4 and 5 are united respectively to terminations 7 and 8, the ferrule in each case being of a lightweight aluminium alloy such as that sold in the United Kingdom under the trademark "Dural." Termination 6 is a housing for light bulb and terminations 7 and 8 are each adapted to be connected to a switch casing by means of lock nuts 17 and 18.

What is claimed is:

1. In combination, a fitting and a tubular member joined to one another, said tubular member having a plurality of transverse circumferential grooves and ribs disposed in alternate relation to one another longitudinally of said tubular member, there being an absence of such grooves and ribs adjacent one end of said tubular member so that said one end presents a substantially smooth cylindrical surface on both its interior and exterior, said one end of said tubular member comprising a pressure-deformable material, at least part of said fitting being fabricated of irradiated shrink-down material, said fitting being united with said tubular member by having at least said part shrunken over the smooth cylindrical exterior surface of said one end of said tubular member, an end edge of said fitting part being positioned to overlie and extend into a groove located between two adjacent ones of said ribs on the exterior of said tubular member, and a substantially rigid, hollow, cylindrical ferrule disposed within said one end of said tubular member, said ferrule having a smooth external surface contiguous with the smooth interior surface of said one end of said tubular member.

2. The combination as claimed in claim 1, wherein said hollow cylindrical ferrule is fabricated of a suitable plastics material.

3. The combination as claimed in claim 1, wherein said hollow cylindrical ferrule is of a light-weight aluminium alloy.

4. The combination as claimed in claim 1, wherein said ferrule is adhesively retained within said end of said tubular member.

5. The combination as claimed in claim 1, wherein adhesive is provided between said fitting and said tubular member.

6. The combination of claim 1 wherein the innermost end of said ferrule abuts one of said grooves internally of said tubular member.

References Cited

UNITED STATES PATENTS

| | | | |
|---|---|---|---|
| 2,323,912 | 7/1943 | Johnson | 285—(Cor. Digest) |
| 2,861,527 | 11/1958 | Phillips | 285—(Cor. Digest) |
| 3,226,807 | 1/1966 | Orr | 285—(Mastic Dig.) |
| 3,315,986 | 4/1967 | Quick | 285—381X |
| 3,423,518 | 1/1969 | Weagant | 285—381X |

THOMAS F. CALLAGHAN, Primary Examiner

U.S. Cl. X.R.

264—230; 285—150, 242